United States Patent
Rodriguez et al.

(10) Patent No.: US 6,912,393 B1
(45) Date of Patent: Jun. 28, 2005

(54) REDUCTION OF TRANSMISSION BANDWIDTH USE IN TELECOMMUNICATION BY PROVIDING MINIMUM BANDWIDTH STATE DURING ON-HOLD CONDITION

(75) Inventors: Herman Rodriguez, Austin, TX (US); Newton James Smith, Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 09/544,275

(22) Filed: Apr. 6, 2000

(51) Int. Cl.[7] .................................................. H04Q 8/20
(52) U.S. Cl. ............... 455/450; 455/452.1; 455/452.2; 455/406; 455/408; 455/453; 455/62; 455/464; 455/9; 455/69; 455/266; 380/546
(58) Field of Search ........................... 455/450, 452, 455/406, 408, 453, 62, 464, 9, 69, 266; 370/546

(56) References Cited

U.S. PATENT DOCUMENTS 5,828,737 A * 10/1998 Sawyer ....................... 370/546
6,047,006 A * 4/2000 Brakefield et al. .......... 370/357

* cited by examiner

Primary Examiner—David Hudspeth
Assistant Examiner—David Nguyen
(74) Attorney, Agent, or Firm—Jerry B Kraft; Jeffrey S LaBaw

(57) ABSTRACT

Transmission bandwidth consumption during the on-hold condition in telecommunications is reduced in a telecommunications system providing communication channels for the transmission of data between system stations. Two bandwidth states for each connecting channel are provided: an active state granting maximum bandwidth for the transmission of data and, for an on-hold condition, a minimal activity state for the connecting channel granting a minimal bandwidth. The active state prevails during the communication unless detecting means detect an on-hold condition in said connecting channel. Then, means responsive to a detection of on-hold condition switch to and provide a minimal activity state for said connecting channel granting a minimal bandwidth.

18 Claims, 3 Drawing Sheets

REDUCTION OF TRANSMISSION BANDWIDTH USE IN TELECOMMUNICATION BY PROVIDING MINIMUM BANDWIDTH STATE DURING ON-HOLD CONDITION

TECHNICAL FIELD

The present invention relates to telecommunications systems involving transmission over connecting channels, and particularly to reducing bandwidth use within such channels during station to station communication sessions.

BACKGROUND OF RELATED ART

With the globalization of business, industry and trade wherein transactions and activities within these fields have been changing from localized organizations to diverse transactions over the face of the world, the telecommunications industries have, accordingly, been expanding rapidly. While telecommunications technology development has been advancing to keep pace with expanded demands, communication channel bandwidth remains the commodity still in short supply. Bandwidth is the amount of data that can be transmitted via a given communications channel in a given unit of time (generally one second). For digital communication, bandwidth is measured in bits per second (bps). The bandwidth of analog transmission is measured in cycles per second (cps). In conventional, long distance telephone communication, the bandwidth cost contributes to the high rate charges. However, it is in cellular or mobile telephone communications where the bandwidth costs have the greatest impact on the cost of communication. In all analog and digital mobile telephone communications, a physical channel or group of channels is reserved or dedicated to carry a given call. The charges of a cellular or mobile (the terms are used interchangeably) call are based upon the length of the call since once a given channel is dedicated for the connected call, all of the bandwidth provided for the connected channel is then put in use, i.e. reserved for use by the user or subscriber, and, thus, unavailable for other communications or users. With the coming of the recent bandwidth on demand provision for mobile communications, the cost of such mobile communications has increased even further because there is provided a very high maximum bandwidth for the duration of the telecommunication sessions irrespective of actual consumption and, thus, the cost to the caller is based upon such maximum rate irrespective of actual usage. U.S. Pat. No. 5,828,737 recognizes this problem and proposes that the actual use of bandwidth in a connected channel be monitored throughout a communication session and the billing be based upon actual use of bandwidth. U.S. Pat. No. 5,970,403 proposes that the total bandwidth usage of all of the cellular phones or devices in a given communication area be monitored, and that the rates to individual users be adjusted based upon such total usage. While both of these patents cover expedients which may be expected to reduce bandwidth consumption and/or at least make the rates for bandwidth consumption more equitable, they involve continuous and commutative bandwidth use tracking which may be relatively expensive and require the use of considerable computer resources.

SUMMARY OF THE PRESENT INVENTION

The present inventors found that bandwidth use and, consequently, cost may be considerably reduced through a simpler implementation which involves the recognition that the on-hold condition to which a great number of telephone calls and related transmissions are subjected consumes a surprising amount of unproductive bandwidth, particularly in business and industry transmissions. Almost everyone who has sought product service help or business or technical information from a commercial or industrial organization has been subject to a familiar: "The waiting time for technical support is now 11 minutes. We appreciate your business. Please continue to hold for the next . . . , etc.".

As set forth above, in most telecommunication systems where the full active bandwidth is provided during the call or communication and billed accordingly based on the length of the call, on-hold conditions which consume a substantial portion of the call may be quite costly. This is particularly the case with cellular or mobile calls and especially the now common bandwidth on demand cellular systems which must provide maximum bandwidth throughout the communication.

The present invention provides a solution which reduces transmission bandwidth consumption during the on-hold condition with a simple cost effective implementation. In summary, the invention is directed to a telecommunications system providing communication channels for the transmission of data between system stations which comprise means for connecting a plurality of stations through the communication channels. The invention provides for two bandwidth states for each connecting channel: an active state granting maximum bandwidth at a level predetermined to be adequate for any potential user transmission of data and a minimal activity state for the connecting channel granting a minimal bandwidth. The active state prevails during the communication unless detecting means detect an on-hold condition in the connecting channel. Then, means responsive to a detection of on-hold condition switch to and provide a minimal activity state for said connecting channel granting a minimal bandwidth.

The invention is particularly advantageous when the telecommunication system is a wireless system, and the communication channels are wireless channels and especially when the means for providing said active state grants bandwidth on demand for the transmission of data.

The telecommunication system also should include means for detecting the ending of said on-hold condition, and means responsive to a detection of the end of said on-hold condition for resuming said active state for the connecting channel. The system also includes means for tracking the amount of time said connecting channel is in the active state and in the minimal activity state to thereby permit the billing of the minimal state at a lower rate or cost. The present invention functions to reduce on-hold or minimal activity rates in fully wired, as well as wireless, telecommunication systems.

An additional advantage of the present invention is that by minimizing bandwidth use during on-hold periods, the conserved bandwidth may be redistribued and used for other transmission needs.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 2:
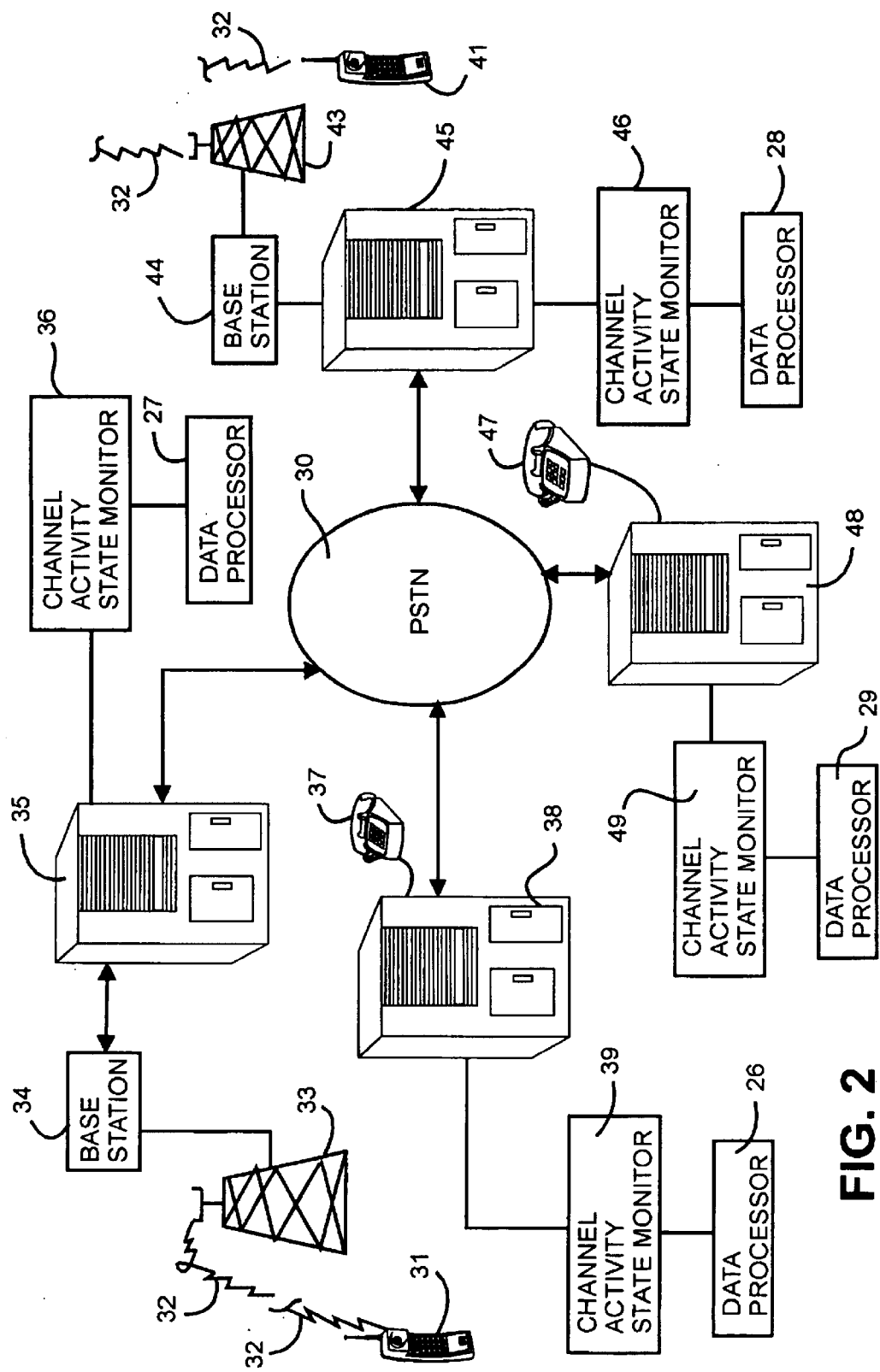
FIG. 2 is a generalized diagrammatic view of a portion of a Public Switched Transmission Network showing channel paths to and from both conventional and mobile channels on which the present invention is implemented.

Referring first to FIG. 2, there is shown a generalized diagrammatic view of a portion of a Public Switched Telephone Network (PSTN) showing channel paths to and from both conventional and mobile channels and devices. Conventional telephones 37 and 47 are respectively connected to the PSTN 30 via local switching centers or switching nodes 38 and 48 in a fully wired telecommunication ysytem. Conventionally, these switching centers have many telephones 37, 47 connected to each. The centers operate to control the channel connections, i.e. switch into and out of the PSTN 30, those calls originated or terminated at telephone stations 37 and 47. In a similar way, mobile or cellular telephones 31 and 41 are respectively connected via satellite or like wireless air interface transmission paths 32 to cell receiving/transmission sites 33 and 43. It will also be understood that each illustrative cell site 33, 43 will have many cellular phones with wireless connectability to the respective site. There is a base station 34 and 44 respectively associated with each site 33 and 43 for achieving transmitting/receiving RF communications via the air interfaces 32 to the cellular phones 31 and 41. The base stations 34 and 44 are respectively connected to switching stations 35 and 45, which, in this case, are mobile switching stations. These mobile switching stations perform functions like those of local switching stations 38 and 48. Switching stations 35 and 45 connect the channels from the cellular phones 31 and 41 into the PSTN 30.

All of the switching stations, local 38 and 48, as well as mobile 35 and 45 maintain call records. Each has respectively associated with it a channel activity state monitor 39, 49, 36, 46 which monitors the activity condition, e.g. on-hold, and, thus, controls the bandwidth to be applied, as will hereinafter be described in greater detail. These monitors may respectively be under the control of data processors 26, 27, 28 and 29 operating control programs, as will be described with respect to FIG. 3. The monitoring may be done on received communication channels, transmitted communication channels or both. In cellular or mobile communications, monitoring in both directions may be preferred in that the user is usually billed for use of a channel irrespective of whether the communication is being received or transmitted. The on-hold condition may be monitored as follows. The participant in the phone session who creates the on-hold generates an indicator for the on-hold which is transmitted to all of the other participants in the session. For analog phones this may be any selected appropriate analog signal. For most telephone systems which are digital, a data packet, the "hold packet", may be sent from the telecommunications session participant who creates the on-hold to all of the other participants. In addition to the data for initiating the on-hold, the hold packet should have data, e.g. telephone numbers, identifying the on-hold creator as well as the on-hold receiver participants in the session. When the on-hold packet is received, then channel activity monitor 36, 38, 46 or 49 associated with the respective telephone switching station detects the hold and casues the respective switiching station 35, 38, 45 or 48 to go into the minimal activity bandwidth. To terminate the hold, the participant who created the on-hold sends a second data packet terminating the on-hold which is similarly detected and initiates the switch back to the active bandwidth state.

Figure 1:
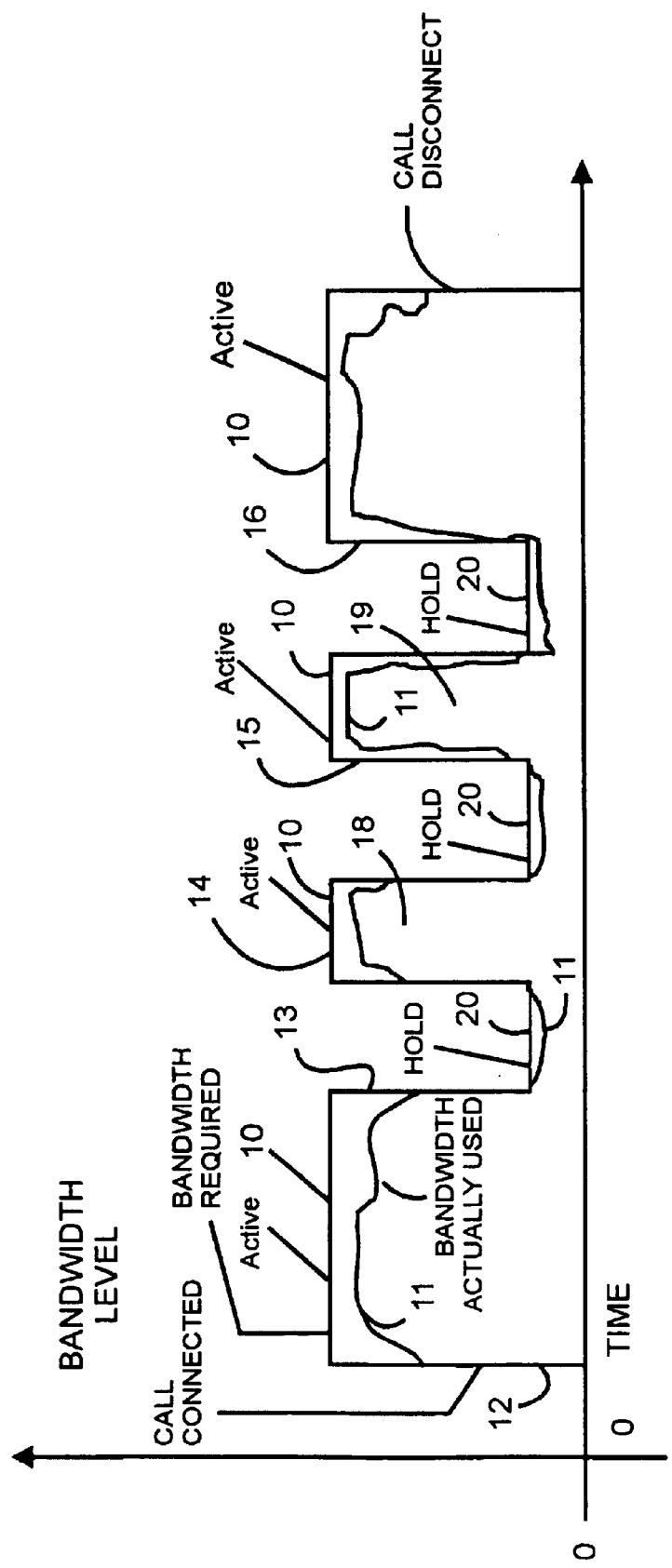
FIG. 1 is a graph showing a connected communication bandwidth with a time sequence from a connection of a call within a communication channel showing the two states of the provided bandwidth and the bandwidth actually used.

Referring now to FIG. 1, let us consider an illustrative graph showing a connected communication channel bandwidth with time sequence from a connection of a call within a communication channel showing the two states of the provided bandwidth and the bandwidth actually used. Until the call connection is completed, zero or near zero bandwidth is provided. At time point 12, the connecting of the call or communication is completed and the full required bandwidth for the active state is provided 10. This is in excess of the bandwidth actually used 11. Particularly in mobile phone systems and especially those with bandwidth on demand, this maximum bandwidth in the active state has to be quite high since it has been anticipated to satisfy any level of user bandwidth demand. However, at time point 13, the communication is put on-hold. When this on-hold initial point is sensed, the second minimal bandwidth state 20 is provided which is just enough to sustain the low actual bandwidth 11 needed during hold. In this example, the on-hold state 20 should be relatively long but interrupted by two active state pulses 18 and 19. These could be periods when the on-hold is removed just long enough to advise the user that his wait time has now shrunk for example to just four minutes and then again to just two minutes. Here again, when the time points, 14, 15 and 16 indicate the end of on-hold and the active high maximum bandwidth is restored in each case. At the end of the communication or call disconnect, the monitoring is ended and the commutative bandwidth time in the two: active and hold times, are recorded for billing purposes.

Figure 3:
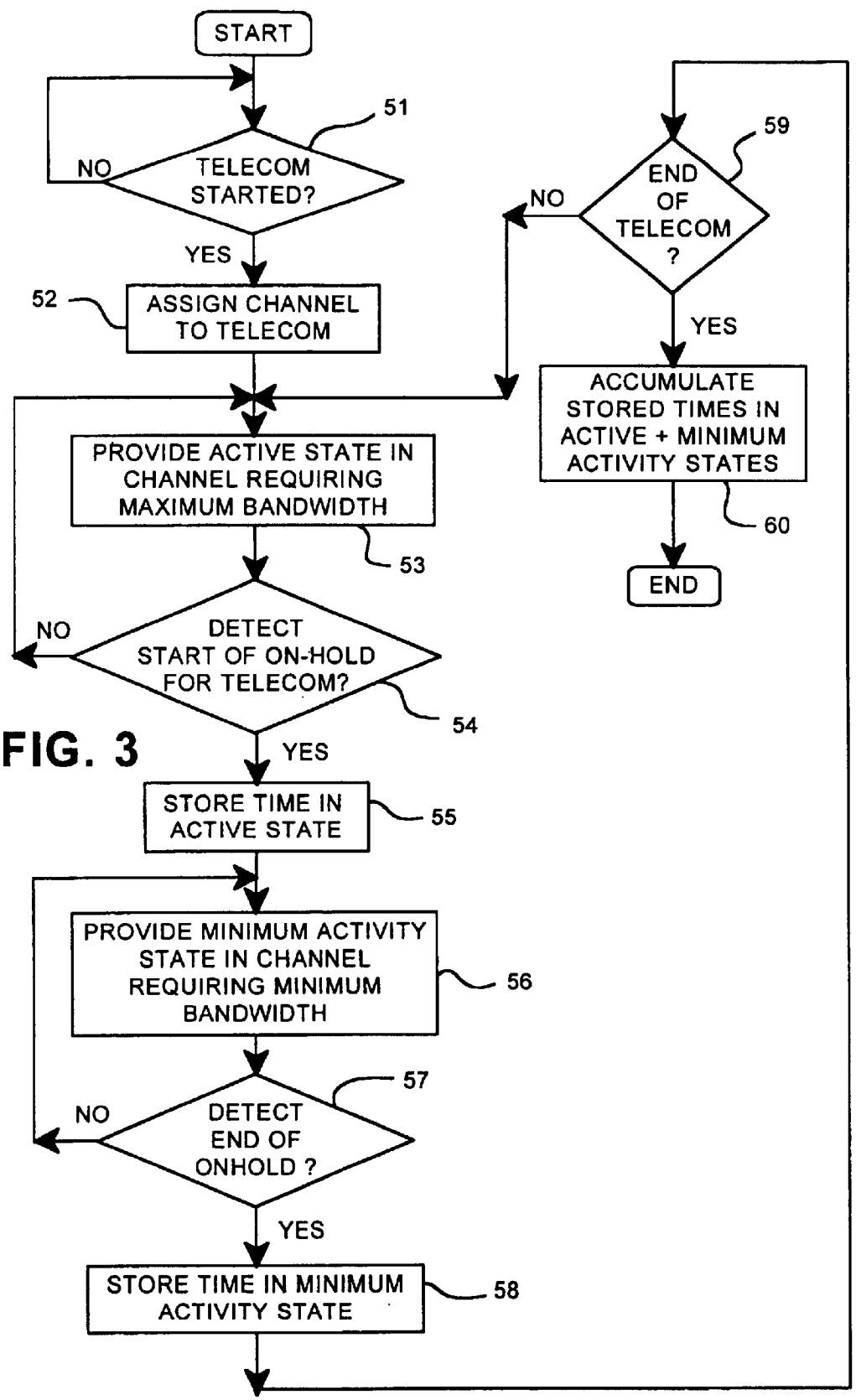
FIG. 3 is a flowchart of an illustrative run of a program set up in accordance with the present invention to monitor connected communication channels for the on-hold condition to provide two states: on-hold and active, respectively, with minimum and maximum bandwidths, and to track and accumulate the times in each state.

With reference to FIG. 3, there will be described an illustrative run of a program set up in accordance with the present invention to monitor connected communication channels for the on-hold condition and to provide two states: on-hold and active, respectively, with minimum and maximum bandwidths, and to track and accumulate the times in each state. A determination is made, step 51, as to whether a telecommunication has been connected. If No, the process is looped back to step 51, and such a connection is awaited. If Yes, a channel is assigned to the telecommunication, step 52, and the channel is put into the active state which required the maximum bandwidth, step 53. This active bandwidth state is maintained until a determination is made, step 54, that the start of an on-hold condition has been detected. If No, then the process is looped back to step 53 and the active bandwidth state continues to be maintained. If Yes, on-hold has been detected, the accumulated time in the active bandwidth state is recorded, step 55, and a minimum activity state in the connected channel which requires the minimum bandwidth is provided, step 56. This minimum bandwidth state is maintained until a determination is made, step 57, that the end of an on-hold condition has been detected. If No, then the process is looped back to step 56 and the minimum bandwidth state continues to be maintained. If Yes, the end of the on-hold condition has been detected, the accumulated bandwidth time in the minimum state is recorded, step 58. Then, a determination is made, step 59, as to whether we are at the end of the telecommunication session. If No, the process is returned to step 53 and the channel is put into the active state which requires the maximum bandwidth. If the decision in step 59 is Yes, the telecommunication session has ended, then, the total time in each of the active and minimal bandwidth states is accumulated for billing purposes and the session is at an end.

An implementation of the present invention is an application program made up of programming steps or instructions as generally described in FIG. 3. Until required, the program instructions may be stored in any readable medium, e.g. a disk drive, an optical disk for use in a CD ROM processor input or in a floppy disk for use in a floppy disk drive processor input. Further, the program may be transmitted to one of the processors as required by the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a telecommunications system providing communication channels for the transmission of data between system stations, a setup for reducing transmission bandwidth use comprising:

means for connecting a plurality of stations through said communication channels;

means for providing an active state for at least one of said connecting channels granting maximum bandwidth for the transmission of data;

means for detecting an on-hold condition in said connecting channel; and means responsive to a detection of on-hold, for providing a minimal activity state for said connecting channel granting a minimal bandwidth.

2. The telecommunication system of claim 1 wherein said system is a wireless telecommunication system, and said communication channels are wireless channels.

3. The telecommunication system of claim 2 wherein said means for providing said active state grants bandwidth on demand for the transmission of data.

4. The telecommunication system of claim 1 further including:

means for detecting the ending of said on-hold condition; and means responsive to a detection of the ending of aid on-hold condition, for resuming said active state or said connecting channel.

5. The telecommunications system of claim 4 further including means for tracking the amount of time said connecting channel is in said active state and in said minimal activity state.

6. In a telecommunications system providing communication channels for the transmission of data between system stations, a method for reducing transmission bandwidth use comprising:

connecting a plurality of stations through said communication channels;

providing an active state for at least one of said connecting channels granting maximum bandwidth for the transmission of data;

detecting an on-hold condition in said connecting channel; and responsive to a detection of on-hold, providing a minimal activity state for said connecting channel granting a minimal bandwidth.

7. The telecommunication method of claim 6 wherein said method is a wireless telecommunication method, and said communication channels are wireless channels.

8. The telecommunication method of claim 7 wherein said step of providing said active state grants bandwidth on demand for the transmission of data.

9. The telecommunication method of claim 6 further including the steps of:

detecting the ending of said on-hold condition; and resuming said active state for said connecting channel responsive to a detection of the ending of said on-hold condition.

10. The telecommunication method of claim 9 further including the step of tracking the amount of time said connecting channel is in said active state and in said minimal activity state.

11. In a telecommunications system providing communication channels for the transmission of data between system stations, a subscriber billing method for reducing the subscriber rate for telecommunications time spent on-hold comprising:

connecting a plurality of stations through said communication channels;

providing an active states for said connecting channels granting maximum bandwidth for the transmission of data;

detecting an on-hold conditions in said connecting channels;

responsive to a detection of on-hold conditions, providing a minimal activity state for said connecting channels granting a minimal bandwidth;

tracking the amount of time said connecting channels are in said active state and in said minimal activity state, and billing subscribers at a lower time of use rate for the amount of time that the connecting channels used for subscribers' communications are in the minimal activity state than for the time that the connecting channnels for subscribers' communications are in the active state.

12. A computer program having code recorded on a computer readable medium for reducing transmission bandwidth use in a telecommunications system providing communication channels for the transmission of data between system stations, said computer program comprising:

means for connecting a plurality of stations through said communication channels;

means for providing an active state for at least one of said connecting channels granting maximum bandwidth for the transmission of data;

means for detecting an on-hold condition in said connecting channel; and means responsive to a detection of on-hold, for providing a minimal activity state for said connecting channel granting a minimal bandwidth.

13. The computer program of claim 12 wherein said system is a wireless telecommunication system, and said communication channels are wireless channels.

14. The computer program of claim 13 wherein said means for providing said active state grants bandwidth on demand for the transmission of data.

15. The computer program of claim 12 further including:

means for detecting the ending of said on-hold condition; and means responsive to a detection of the ending of said on-hold condition, for resuming said active state for said connecting channel.

16. The computer program of claim 15 further including means for tracking the amount of time said connecting channel is in said active state and in said minimal activity state.

17. The telecommunications system of claim 1 further including means responsive to an on-hold condition in said connecting channel for generating an on-hold signal, said signal being detectable by said means for detecting an on-hold condition.

18. The computer program of claim 15 further including means responsive to an on-hold condition in said connecting channel for generating an on-hold signal, said signal being detectable by said means for detecting an on-hold condition.

* * * * *

UNITED STATES PATENT AND TRADEMARK OFFICE
CERTIFICATE OF CORRECTION

PATENT NO. : 6,912,393 B1
DATED : June 28, 2005
INVENTOR(S) : Rodriguez et al.

Page 1 of 1

It is certified that error appears in the above-identified patent and that said Letters Patent is hereby corrected as shown below:

<u>Column 5,</u>
Line 46, please delete "aid" and insert -- said --.

Signed and Sealed this

Twenty-seventh Day of September, 2005

JON W. DUDAS
*Director of the United States Patent and Trademark Office*